United States Patent
Ito et al.

(10) Patent No.: US 9,489,041 B2
(45) Date of Patent: Nov. 8, 2016

(54) INPUT DEVICE, INPUT SYSTEM, ELECTRONIC APPARATUS, AND SENSE PRESENTATION METHOD

(71) Applicants: SONY CORPORATION, Tokyo (JP); TOHOKU UNIVERSITY, Miyagi (JP)

(72) Inventors: Osamu Ito, Tokyo (JP); Hideo Kawabe, Tokyo (JP); Masashi Konyo, Miyagi (JP)

(73) Assignees: Sony Corporation, Tokyo (JP); Tohoku Univeristy, Miyagi (JP)

( * ) Notice: Subject to any disclaimer, the term of this patent is extended or adjusted under 35 U.S.C. 154(b) by 0 days.

(21) Appl. No.: 13/962,595

(22) Filed: Aug. 8, 2013

(65) Prior Publication Data
US 2014/0059255 A1    Feb. 27, 2014

(30) Foreign Application Priority Data

Aug. 23, 2012   (JP) .................. 2012-184042

(51) Int. Cl.
  *G06F 3/00*   (2006.01)
  *G06F 3/01*   (2006.01)
  *G06F 3/03*   (2006.01)
(52) U.S. Cl.
  CPC .............. *G06F 3/011* (2013.01); *G06F 3/016* (2013.01); *G06F 3/0304* (2013.01)
(58) Field of Classification Search
  None
  See application file for complete search history.

(56) References Cited

U.S. PATENT DOCUMENTS

| | | | |
|---|---|---|---|
| 5,555,894 A | 9/1996 | Doyama et al. | |
| 6,200,253 B1 * | 3/2001 | Nishiumi | A63F 13/02 463/47 |
| 7,980,952 B2 * | 7/2011 | Ohta | 463/36 |
| 8,226,484 B2 * | 7/2012 | Bryant et al. | 463/39 |
| 2002/0021277 A1 | 2/2002 | Kramer et al. | |
| 2008/0043042 A1 * | 2/2008 | Bassett | G06T 13/20 345/646 |
| 2012/0065784 A1 * | 3/2012 | Feldman | 700/280 |
| 2013/0229371 A1 * | 9/2013 | Lee | G06F 3/0414 345/173 |

FOREIGN PATENT DOCUMENTS

| | | |
|---|---|---|
| JP | H07-146751 A | 6/1995 |
| JP | 2009-009412 A | 1/2009 |
| JP | 2011-159100 | 8/2011 |
| WO | 2009/035100 A1 | 3/2009 |
| WO | 2010/038822 A1 | 4/2010 |

OTHER PUBLICATIONS

Japanese Office Action (with English translation) issued on Apr. 26, 2016 in corresponding Japanese application No. 2012-184042 (13 pages).

* cited by examiner

*Primary Examiner* — Michael Sun
(74) *Attorney, Agent, or Firm* — K&L Gates LLP

(57) ABSTRACT

An input device includes an operation portion configured to receive an input operation made by a user, a vibration portion configured to vibrate the operation portion, a detection portion configured to detect the input operation, and a controller configured to determine a vibration condition of the vibration portion based on the input operation detected by the detection portion and present an elastic sense to the user by driving the vibration portion under the determined vibration condition.

16 Claims, 13 Drawing Sheets

INPUT DEVICE, INPUT SYSTEM, ELECTRONIC APPARATUS, AND SENSE PRESENTATION METHOD

CROSS REFERENCES TO RELATED APPLICATIONS

The present application claims priority to Japanese Priority Patent Application JP 2012-184042 filed in the Japan Patent Office on Aug. 23, 2012, the entire content of which is hereby incorporated by reference.

BACKGROUND

The present disclosure relates to an input device, an input system, an electronic apparatus, and a sense presentation method that are capable of presenting senses recognizable by a user.

In addition to input devices that output user input operations, there is also an input device capable of presenting some kind of senses to a user at a time the user makes an input operation. Such an input device reproduces a virtual stimulation that an operation target, that is a target of a user input operation, is to receive, and imparts such a stimulation to the user. As a result, in such an input device, a sense as if a hand or finger of the user is actually the operation target can be presented to the user. Japanese Patent Application Laid-open No. 2011-159100 discloses a technique that is used to present a sense in which a viscosity and inertia are reproduced to a user.

SUMMARY

There are various senses that a user actually receives. Therefore, it is desirable for the input device to be capable of presenting senses other than a viscous sense and an inertial sense regarding the user input operations.

In view of the circumstances as described above, there is a need for an input device, an input system, an electronic apparatus, and a sense presentation method that are capable of presenting an elastic sense to a user.

According to an embodiment of the present disclosure, there is provided an input device including an operation portion, a vibration portion, a detection portion, and a controller.

The operation portion is configured to receive an input operation made by a user.

The vibration portion is configured to vibrate the operation portion.

The detection portion is configured to detect the input operation.

The controller is configured to determine a vibration condition of the vibration portion based on the input operation detected by the detection portion and present an elastic sense to the user by driving the vibration portion under the determined vibration condition.

According to another embodiment of the present disclosure, there is provided an input system including an input device, a detection portion, and a controller.

The input device includes an operation portion that receives an input operation made by a user and a vibration portion that vibrates the operation portion.

The detection portion is configured to detect the input operation.

The controller is configured to determine a vibration condition of the vibration portion based on the input operation detected by the detection portion and present an elastic sense to the user by driving the vibration portion under the determined vibration condition.

According to another embodiment of the present disclosure, there is provided an electronic apparatus including an operation portion, a vibration portion, a detection portion, a display portion, and a controller.

The operation portion is configured to receive an input operation made by a user.

The vibration portion is configured to vibrate the operation portion.

The detection portion is configured to detect the input operation.

The display portion includes a screen for displaying an image.

The controller is configured to control a movement of an operation target displayed on the screen based on the input operation, determine a vibration condition of the vibration portion based on a relative position between an object and the operation target displayed on the screen, and present an elastic sense to the user by driving the vibration portion under the determined vibration condition.

According to another embodiment of the present disclosure, there is provided a sense presentation method including: detecting an input operation of a user with respect to an operation portion; determining a vibration condition of the operation portion based on the detected input operation; and presenting an elastic sense to the user by vibrating the operation portion under the determined vibration condition.

As described above, according to the embodiments of the present disclosure, an input device, an input system, an electronic apparatus, and a sense presentation method that are capable of presenting an elastic sense to the user can be provided.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments of the present disclosure will be described with reference to the drawings.

First Embodiment

Overall Structure

Figure 1:
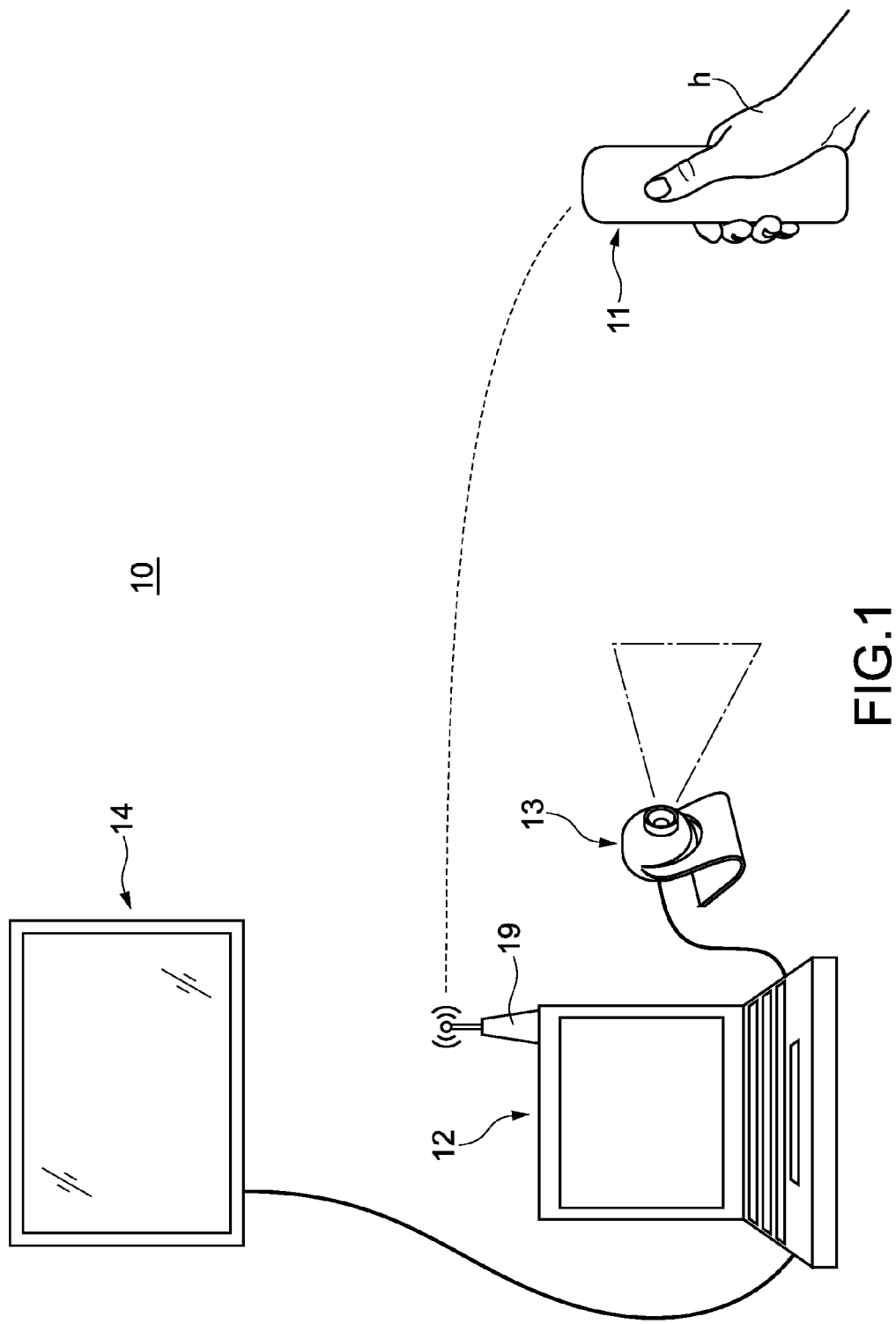
FIG. 1 is a schematic structural diagram of an input system according to a first embodiment of the present disclosure.
Figure 2:
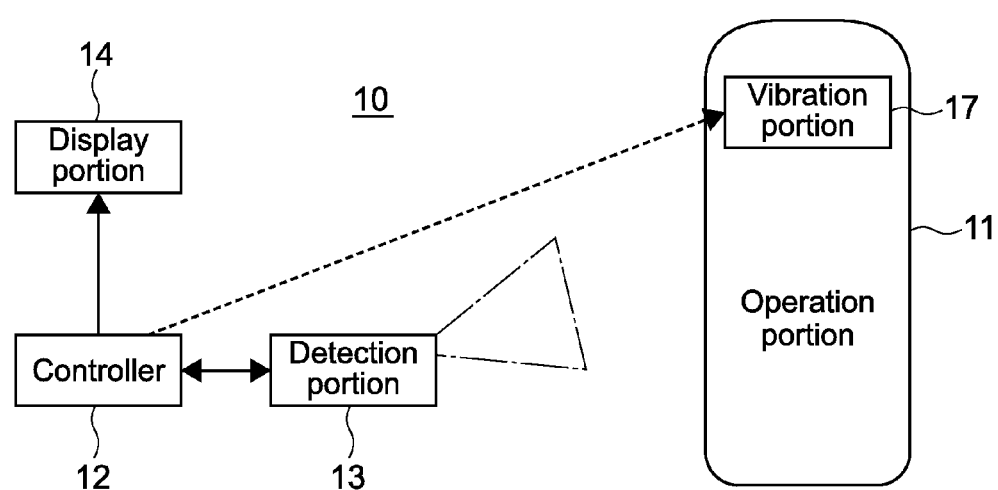
FIG. 2 is a functional block diagram of the input system shown in FIG. 1.

FIG. 1 is a schematic structural diagram of an input system 10 according to a first embodiment of the present disclosure. FIG. 2 is a functional block diagram of the input system 10 shown in FIG. 1. The input system 10 includes an operation portion 11, a controller 12, a detection portion 13, and a display portion 14.

The operation portion 11 receives an input operation made by a hand h of a user. The input system 10 includes a vibration portion 17 (see FIG. 2) inside the operation portion 11. The controller 12 includes an antenna 19 that wirelessly transmits a signal for driving the vibration portion 17. The detection portion 13 and the display portion 14 are connected by wires to the controller 12.

The operation portion 11 is structured as an input device. The user holds the operation portion 11 with the hand h and makes an input operation by moving the operation portion 11. The detection portion 13 detects a position of the operation portion 11 as the input operation of the user and outputs the detection result to the controller 12. The controller 12 controls display on a screen 14a of the display portion 14 based on the detection result input from the detection portion 13.

[Structure of Operation Portion]

The operation portion 11 includes a casing that is formed as a bar so that the user can easily grab it with the hand h, and the vibration portion 17 provided inside the casing. The vibration portion 17 can be vibrated, and the operation portion 11 is structured such that the vibration of the vibration portion 17 favorably propagates to the hand h of the user via the casing.

The vibration portion 17 is switched between an on state and an off state by the controller 12. The on state is a state where the vibration portion 17 can be vibrated, and the off state is a state where the vibration portion 17 cannot be vibrated.

The vibration direction of the vibration portion 17 in the on state may either be isotropic or anisotropic. The vibration portion 17 only needs to be capable of being vibrated in at least one direction, but may be capable of being vibrated in a plurality of directions. The vibration portion 17 capable of being vibrated in the plurality of directions may have such a structure that the controller 12 can control the vibration direction thereof. As the vibration portion 17, any of controllers that use various actuators such as a motor can be adopted.

The operation portion 11 may be structured such that input operations other than the movement thereof can also be input by the user. In this case, an operation button, a slide lever, and the like exposed from the casing of the operation portion 11 are provided as appropriate.

[Structure of Detection Portion]

As the detection portion 13, a CCD (Charge Coupled Device) image sensor capable of detecting a position of the operation portion 11 is used. In addition to the CCD image sensor, a CMOS (Complementary Metal Oxide Semiconductor) image sensor may also be used as the detection portion 13.

A timing at which the detection portion 13 detects the position of the operation portion 11 is controlled by the controller 12. Specifically, the detection portion 13 detects the position of the operation portion 11 every time a timing signal transmitted from the controller 12 is received. It should be noted that the detection portion 13 may be structured to constantly monitor the position of the operation portion 11, but with a structure to detect the position of the operation portion 11 at predetermined timings, the overall power consumption is reduced more.

[Structure of Controller]

As the controller 12, a generally-used personal computer is used. The controller 12 only needs to process the detection result (positional information of operation portion 11) input from the detection portion 13 and output it to the display portion 14 and the operation portion 11. Therefore, the controller 12 does not need to include all structural elements of the generally-used personal computer. As the antenna 19 mounted on the controller 12, an antenna capable of transmitting an output signal of the controller 12 to the operation portion 11 only needs to be used.

[Structure of Display Portion]

As the display portion 14, a display including a generally-used screen 14a is used. A form of the display used as the display portion 14 is not limited. Examples of such a display form include liquid crystal, plasma, and organic EL (Electro-Luminescence).

[Function of Input System]

In the input system 10, the controller 12 executes a predetermined drive as well as switch the vibration portion 17 from the off state to the on state based on an input operation to the operation portion 11 detected by the detection portion 13, the input operation being made by the hand h of the user. As a result, an elastic sense is presented to the hand h of the user.

Figure 3A:
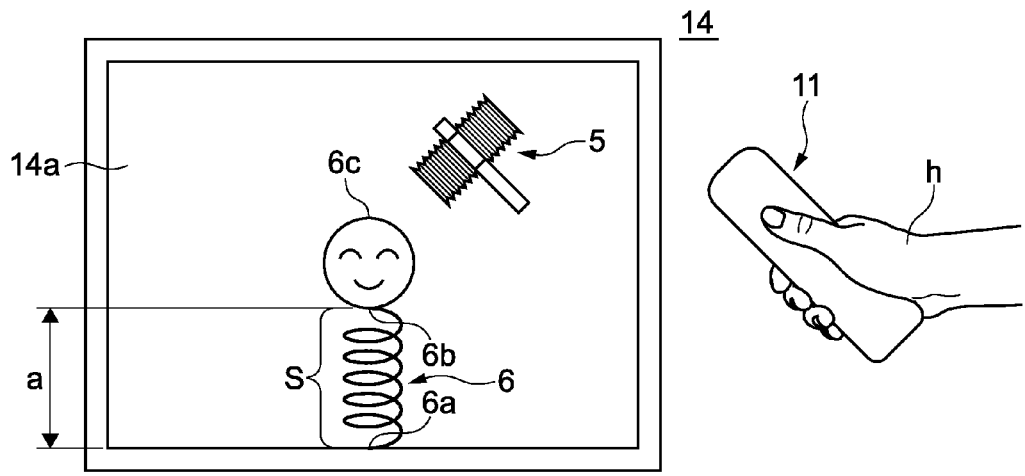
FIGS. 3A to 3C are diagrams showing examples of an operation of the input system shown in FIG. 1.
Figure 3B:
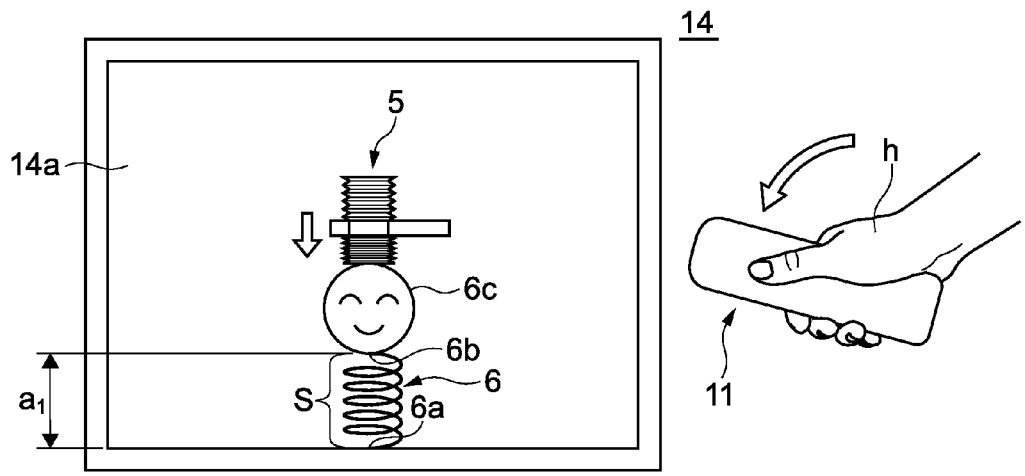
Figure 3C:
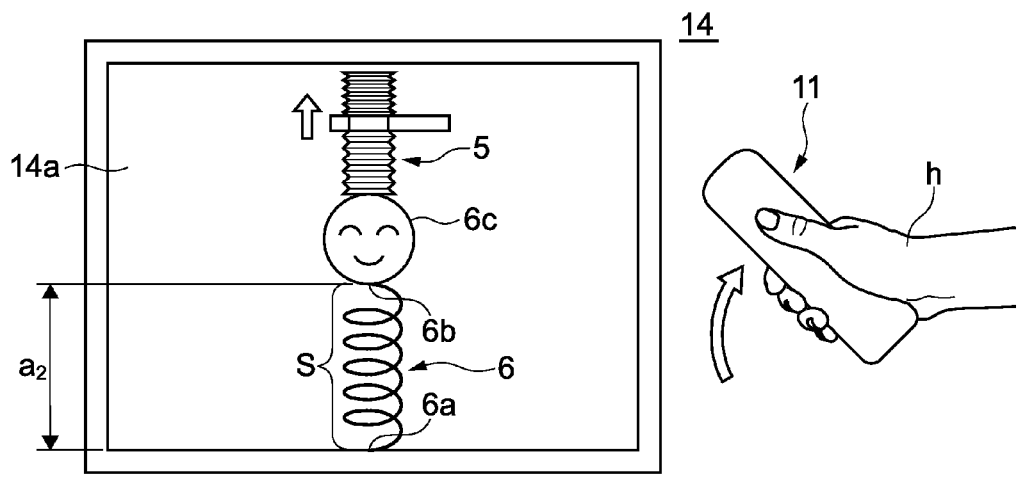

FIGS. 3A to 3C are schematic diagrams each showing display on the screen 14a of the display portion 14 and an operation of the operation portion 11. On the screen 14a, a toy hammer 5 as an operation target that moves by an input operation made by the hand h of the user with respect to the operation portion 11 and a spring toy 6 as an object that receives an action from the hammer 5 are displayed as an image.

As the hammer 5, a generally-used hammer that is formed of a resin and whose hammering portion is formed as bellows is assumed. As the spring toy 6, a toy including a spring S whose lower end portion 6a is fixed and a spherical head portion 6c attached to an upper end portion 6b of the spring S is assumed. The head portion 6c can make up-and-down motions, and the spring S is extendable in accordance with the up-and-down motions of the head portion 6c. As shown in FIG. 3A, a natural length of the spring S (distance between lower end portion 6a and upper end portion 6b) of the spring toy 6 is represented by a.

The controller 12 reproduces, as well as display a series of operations of the hammer 5 hammering the head portion 6c of the spring toy 6 on the screen 14a based on the detection result of the detection portion 13, virtual stimulations corresponding to the elasticity of the spring S, that are supposedly applied to the hammer 5 along with the operations. The controller 12 reproduces the virtual stimulations that are supposedly applied to the hammer 5 by vibrating the vibration portion 17 in the operation portion 11, and thus presents an elastic sense of the spring S to the user.

When the user makes an input operation of swinging down the operation portion 11 at a time the screen 14a is in the state shown in FIG. 3A, the detection portion 13 successively detects the position of the operation portion 11 and outputs the detection result to the controller 12. Based on the detection result from the detection portion 13, the controller 12 displays an operation of the hammer 5 corresponding to the operation of the operation portion 11 on the screen 14a. Specifically, the controller 12 displays, on the screen 14a, an operation in which the hammer 5 moves to the head portion 6c of the spring toy 6 and pushes down the head portion 6c of the spring toy 6 so that the spring S of the spring toy 6 contracts.

On the other hand, when the user makes an input operation of swinging up the operation portion 11 at a time the screen 14a is in the state shown in FIG. 3B, the detection portion 13 successively detects the position of the operation portion 11 and outputs the detection result to the controller 12. Based on the detection result from the detection portion 13, the controller 12 displays an operation of the hammer 5 corresponding to the operation of the operation portion 11 on the screen 14a. Specifically, the controller 12 displays, on the screen 14a, an operation in which the hammer 5 is pushed up together with the head portion 6c of the spring toy 6, and the spring S of the spring toy 6 extends.

Here, a case where the spring S of the spring toy 6 is contracted to $a_1$ shorter than the natural length a by the hammer 5 as shown in FIG. 3B is assumed.

Using a spring constant as a proportional constant, an elastic force of an actual spring becomes larger as a contraction force becomes larger. Therefore, in moving the hammer 5, the user presumes that a resistive force applied to the hammer 5 from the head portion 6c of the spring toy 6 becomes larger as the contraction force of the spring S becomes larger. The controller 12 expresses the elastic sense in which the resistive force applied to the hammer 5 from the head portion 6c of the spring toy 6 becomes larger, by increasing an amplitude A of the vibration of the vibration portion 17 in the operation portion 11.

Specifically, when the spring S is contracted to $a_1$ shorter than the natural length a, the controller 12 can determine the amplitude A at a time the hammer 5 pushes down the head portion 6c of the spring toy 6 further by the following function.

$$A=k_1*(a-a_1)^2+l_1\ (k_1\ \text{and}\ l_1\ \text{are each a predetermined constant}) \quad (1)$$

Here, the length $(a-a_1)$ represents a contraction amount of the spring S. The function expressing the amplitude A of the vibration portion 17 is not limited to the quadratic function (1) of the contraction amount $(a-a_1)$, and other functions that use the contraction amount $(a-a_1)$ as a variable may be used instead. As such a function, for example, a linear function of the contraction amount $(a-a_1)$ or a cubic function of the contraction amount $(a-a_1)$ may be used. When using the linear function of the contraction amount $(a-a_1)$, the spring S having a smaller spring constant than in the case of using the function (1) can be expressed. When using the cubic function of the contraction amount $(a-a_1)$, the spring S having a larger spring constant than in the case of using the function (1) can be expressed.

Next, descriptions will be given on a case where the user makes an input operation of swinging the operation portion 11 higher after the spring S shown in FIG. 3B is brought back to the state where its length is the natural length a from the state where its length is $a_1$.

In this embodiment, as the hammer 5 touches the head portion 6c of the spring toy 6, the hammer 5 adsorbs to the head portion 6c of the spring toy 6. Therefore, when the user makes an input operation of swinging the operation portion 11 higher after the spring S is brought back to the state where its length is the natural length a from the state where its length is $a_1$ on the screen 14a, the controller 12 displays, on the screen 14a, an operation in which the head portion 6c of the spring toy 6 moves upward with the hammer 5, and the spring S of the spring toy 6 extends as shown in FIG. 3C.

On the other hand, when the user makes an input operation of swinging down the operation portion 11 at the time the screen 14a is in the state shown in FIG. 3C, the controller 12 displays, on the screen 14a, an operation in which the hammer 5 is lowered together with the head portion 6c of the spring toy 6 and the spring S of the spring toy 6 contracts.

Here, a case where the spring S of the spring toy 6 is extended to $a_2$ longer than the natural length a by the hammer 5 as shown in FIG. 3C is assumed.

Using a spring constant as a proportional constant, an elastic force of an actual spring becomes larger as an extension amount increases. Therefore, in moving the hammer 5, the user presumes that a resistive force applied to the hammer 5 from the head portion 6c of the spring toy 6 becomes larger as the extension amount of the spring S increases. The controller 12 expresses the elastic sense in which the resistive force applied to the hammer 5 from the head portion 6c of the spring toy 6 becomes larger, by increasing the amplitude A of the vibration of the vibration portion 17 in the operation portion 11.

Specifically, when the spring S is extended to $a_2$ longer than the natural length a, the controller 12 can determine the amplitude A at a time the hammer 5 lifts up the head portion 6c of the spring toy 6 by the following function.

$$A=k_2*(a_2-a)^2+l_2\ (k_2\ \text{and}\ l_2\ \text{are each a predetermined constant}) \quad (2)$$

Here, the length $(a_2-a)$ represents the extension amount of the spring S. The function expressing the amplitude A of the vibration portion 17 is not limited to the quadratic function (2) of the extension amount $(a_2-a)$, and other functions that use the extension amount $(a_2-a)$ as a variable may be used instead. As such a function, for example, a linear function of the extension amount $(a_2-a)$ or a cubic function of the extension amount $(a_2-a)$ may be used. When using the linear function of the extension amount $(a_2-a)$, the spring S having a smaller spring constant than in the case of using the function (2) can be expressed. When using the cubic function of the extension amount $(a_2-a)$, the spring S having a larger spring constant than in the case of using the function (2) can be expressed.

Further, in this embodiment, when the spring S of the spring toy 6 is extended from the natural length a to become a predetermined length on the screen 14a, the elastic force of the spring S becomes larger than the adsorption force between the hammer 5 and the head portion 6c of the spring toy 6, and thus the hammer 5 is released from the head portion 6c of the spring toy 6. At this time, the controller 12 displays an operation in which the spring S of the spring toy 6 returns to the natural length a as the hammer 5 is released from the head portion 6c of the spring toy 6, and controls the display of the screen 14a to set it back to the state shown in FIG. 3A.

It should be noted that the values of the constants $k_1$, $k_2$, $l_1$, and $l_2$ can be determined arbitrarily. When the constants $l_1$ and $l_2$ are 0, the amplitude A of the vibration portion 17 at the time the spring S is the natural length a becomes 0. On the other hand, when the constants $l_1$ and $l_2$ are larger than 0, the amplitude A of the vibration portion 17 at the time the spring S is the natural length a is larger than 0. The constants $l_1$ and $l_2$ can be set to be, for example, several μm in view of a vibration detection threshold value.

Furthermore, when the vibration portion 17 is in the on state, the amplitude A of the vibration portion 17 is controlled by the functions (1) and (2). On the other hand, when the vibration portion 17 is in the off state, the amplitude A of the vibration portion 17 is 0 regardless of the functions (1) and (2).

Summarizing the functions (1) and (2), when the length of the spring S is represented by x, the amplitude A at the time the hammer 5 causes the head portion 6c of the spring toy 6 to move is expressed by the following function. Here, $k_1=k_2=k$ and $l_1=l_2=l$ are satisfied.

$$A=k*|a-x|^2+l \text{ (}k\text{ and }l\text{ are each a predetermined constant)} \quad (3)$$

Here, the length |a−x| represents a displacement amount of the spring S.

Figure 4:
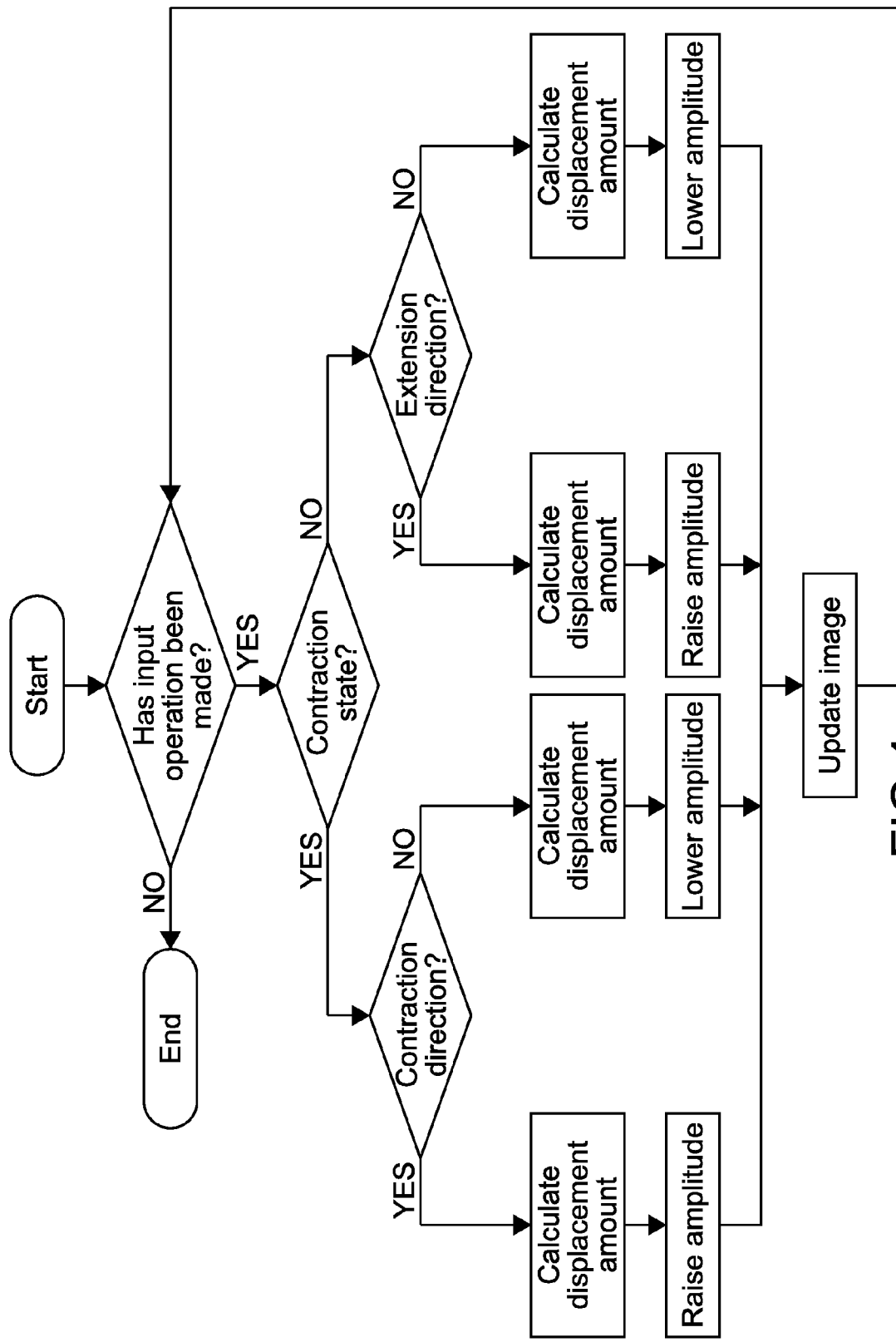
FIG. 4 is a flowchart showing an example of a flow of processing of a controller in the input system shown in FIG. 1.

FIG. 4 is a flowchart showing a flow of processing of the controller 12 that is based on the descriptions above. FIG. 4 shows the flow of processing of the controller 12 in a state where the hammer 5 is in contact with the head portion 6c of the spring toy 6.

First, the controller 12 determines whether an input operation is made by the user and ends, when an input operation is made by the user, processing while the vibration portion 17 is in the on state. When an input operation is made by the user, the controller 12 turns on the vibration portion 17 and determines whether the spring S of the spring toy 6 is contracted (or extended). It should be noted that although the state where the spring S is the natural length a is included in the extension state in FIG. 4, the state where the spring S is the natural length a may instead be included in the contraction state.

When the spring S is contracted to be shorter than the natural length a, the controller 12 determines which of the contraction direction and the extension direction of the spring S the input operation of the user is made in. When the input operation of the user is made in the contraction direction in which the spring S contracts (spring S additionally contracts from natural length a), the controller 12 increases the amplitude A of the vibration portion 17 based on a result of calculating the displacement amount. On the other hand, when the input operation of the user is made in the extension direction in which the spring S extends (spring S extends to return to natural length a), the controller 12 lowers the amplitude A of the vibration portion 17 based on the result of calculating the displacement amount.

On the other hand, when the spring S is extended to be longer than the natural length a, the controller 12 determines which of the extension direction and the contraction direction of the spring S the input operation of the user is made in. When the input operation of the user is made in the extension direction in which the spring S extends (spring S additionally extends from natural length a), the controller 12 increases the amplitude A of the vibration portion 17 based on the result of calculating the displacement amount. On the other hand, when the input operation of the user is made in the contraction direction in which the spring S contracts (spring S contracts to return to natural length a), the controller 12 lowers the amplitude A of the vibration portion 17 based on the result of calculating the displacement amount.

Then, the controller 12 updates the image displayed on the screen 14a to an image corresponding to the relevant state.

Further, for presenting a more realistic elastic sense to the user, the controller 12 may determine the amplitude A of the vibration portion 17 using a function that includes other variables in addition to the length x of the spring S. Examples of the other variables include a movement velocity and acceleration of the hammer 5 that are based on the input operation to the operation portion 11.

Figure 5:
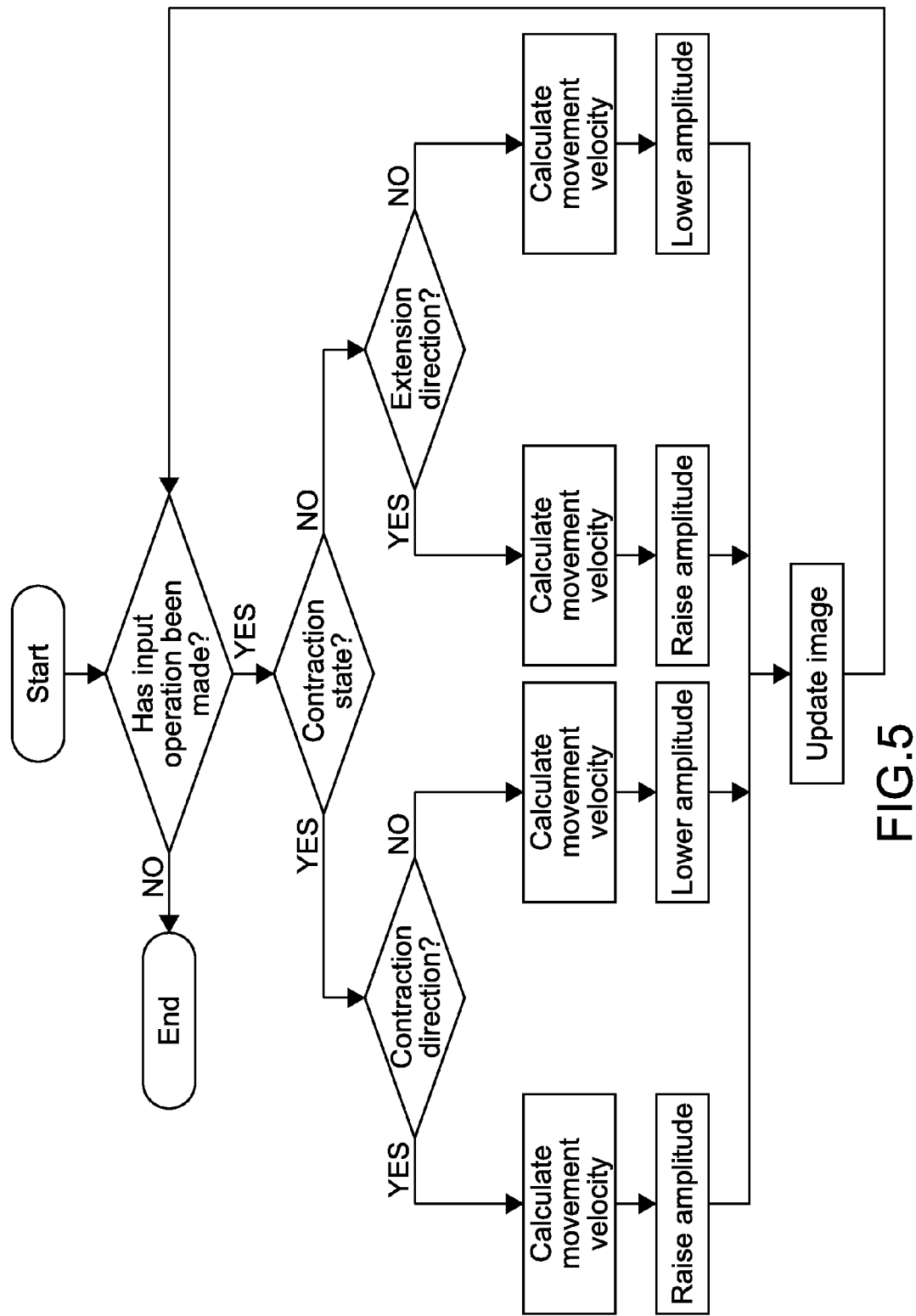
FIG. 5 is a flowchart showing an example of a flow of processing of the controller in the input system shown in FIG. 1.

FIG. 5 is a flowchart showing a flow of processing of the controller 12, that uses a function including the movement velocity of the hammer 5 as the variable. FIG. 5 shows the flow of processing of the controller 12 in a state where the hammer 5 is in contact with the head portion 6c of the spring toy 6. The flow up to the step of determining, by the controller 12, whether the spring S of the spring toy 6 is contracted (or extended) is the same as that of FIG. 4.

When the spring S is contracted to be shorter than the natural length a, the controller 12 determines which of the contraction direction and the extension direction of the spring S the input operation of the user is made in. When the input operation of the user is made in the contraction direction in which the spring S contracts (spring S additionally contracts from natural length a), the controller 12 increases the amplitude A of the vibration portion 17 based on a result of calculating the movement velocity. On the other hand, when the input operation of the user is made in the extension direction in which the spring S extends (spring S extends to return to natural length a), the controller 12 lowers the amplitude A of the vibration portion 17 based on the result of calculating the movement velocity.

On the other hand, when the spring S is extended to be longer than the natural length a, the controller 12 determines which of the extension direction and the contraction direction of the spring S the input operation of the user is made in. When the input operation of the user is made in the extension direction in which the spring S extends (spring S additionally extends from natural length a), the controller 12 increases the amplitude A of the vibration portion 17 based on the result of calculating the movement velocity. On the other hand, when the input operation of the user is made in the contraction direction in which the spring S contracts (spring S contracts to return to natural length a), the controller 12 lowers the amplitude A of the vibration portion 17 based on the result of calculating the movement velocity.

Then, the controller 12 updates the image displayed on the screen 14a to an image corresponding to the relevant state.

Next, control of a frequency f of the vibration portion 17 by the controller 12 will be described. When the vibration portion 17 is in the on state, the frequency f of the vibration portion 17 is controlled by the controller 12 under a predetermined condition. On the other hand, when the vibration portion 17 is in the off state, the frequency f of the vibration portion 17 is 0.

In the on state, the controller 12 may set the frequency f of the vibration portion 17 to be constant or may change it as appropriate. By changing the frequency f of the vibration portion 17 as appropriate, the controller 12 can more realistically express the elastic sense of the spring S.

For example, the controller 12 can determine the frequency f of the vibration portion 17 by the following function (4) in the same manner as in determining the amplitude A of the vibration portion 17 using the function (3).

$$f=m/|a-x|+n \text{ (}m\text{ and }n\text{ are each a constant)} \tag{4}$$

The function expressing the frequency f of the vibration portion 17 is not limited to the function (4), and a different function that uses the displacement amount |a−x| as a variable may also be used. As such a function, as in the function (4), it is desirable for the frequency f to decrease as the displacement amount |a−x| increases.

According to the function (4), the frequency f of the vibration portion 17 is determined unambiguously in accordance with the length x of the spring S from the natural length a thereof. As a result, the user feels the sense in which the spring S is trying to return to the natural length a in accordance with the length x of the spring S.

Specifically, when the length x of the spring S is shorter than the natural length a, the frequency f is lowered when the spring S additionally contracts. Accordingly, the user feels a sense that the contraction of the spring S is being hampered (deceleration sense). Moreover, the frequency f increases when the spring S extends. As a result, the user feels a sense that the extension of the spring S is being accelerated (acceleration sense).

On the contrary, when the length x of the spring S is longer than the natural length a, the frequency f is lowered when the spring S additionally extends. Accordingly, the user feels a sense that the extension of the spring S is being hampered (deceleration sense). Moreover, the frequency f increases when the spring S contracts. As a result, the user feels a sense that the contraction of the spring S is being accelerated (acceleration sense).

It should be noted that the values of the constants m and n can be determined arbitrarily. When the constant n is 0, the frequency f of the vibration portion 17 in the case where the spring S is the natural length a becomes 0. On the other hand, when the constant n is larger than 0, the frequency f of the vibration portion 17 in the case where the spring S is the natural length a becomes larger than 0. The constant n can be set to be, for example, about 100 Hz.

Figure 6:
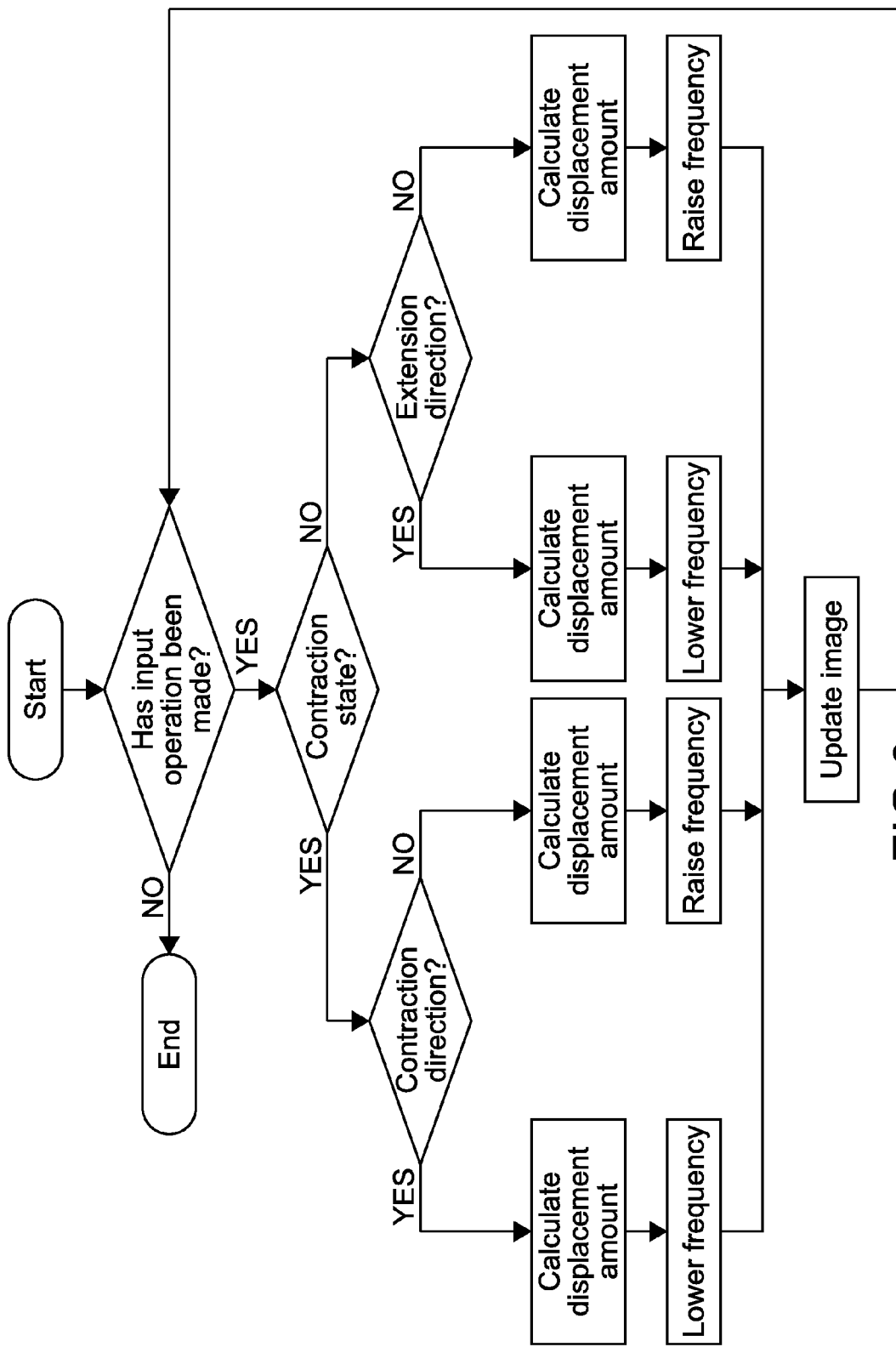
FIG. 6 is a flowchart showing an example of a flow of processing of the controller in the input system shown in FIG. 1.

FIG. 6 is a flowchart showing a flow of processing of the controller 12 that is based on the descriptions above. FIG. 6 shows the flow of processing of the controller 12 in a state where the hammer 5 is in contact with the head portion 6c of the spring toy 6. The flow up to the step of determining, by the controller 12, whether the spring S of the spring toy 6 is contracted (or extended) is the same as that of FIG. 4.

When the spring S is contracted to be shorter than the natural length a, the controller 12 determines which of the contraction direction and the extension direction of the spring S the input operation of the user is made in. When the input operation of the user is made in the contraction direction in which the spring S contracts (spring S additionally contracts from natural length a), the controller 12 lowers the frequency f of the vibration portion 17 based on a result of calculating the displacement amount |a−x|. On the other hand, when the input operation of the user is made in the extension direction in which the spring S extends (spring S extends to return to natural length a), the controller 12 raises the frequency f of the vibration portion 17 based on the result of calculating the displacement amount |a−x|.

On the other hand, when the spring S is extended to be longer than the natural length a, the controller 12 determines which of the extension direction and the contraction direction of the spring S the input operation of the user is made in. When the input operation of the user is made in the extension direction in which the spring S extends (spring S additionally extends from natural length a), the controller 12 lowers the frequency f of the vibration portion 17 based on the result of calculating the displacement amount |a−x|. On the other hand, when the input operation of the user is made in the contraction direction in which the spring S contracts (spring S contracts to return to natural length a), the controller 12 raises the frequency f of the vibration portion 17 based on the result of calculating the displacement amount |a−x|.

Then, the controller 12 updates the image displayed on the screen 14a to an image corresponding to the relevant state.

Further, the frequency f may be changed based on a speed of the input operation to the operation portion 11. The controller 12 can determine the frequency f by the following function that uses, as a variable, the movement velocity v of the hammer 5 based on the input operation to the operation portion 11.

$$f=pv+q \text{ (}p\text{ and }q\text{ are each a constant)} \tag{5}$$

The function expressing the frequency f of the vibration portion 17 is not limited to the function (5), and a different function that uses the movement velocity v of the hammer 5 that is based on the input operation to the operation portion 11 as a variable may also be used. The function expressing the frequency f of the vibration portion 17 may be a function that uses an acceleration of the hammer 5 that is based on the input operation to the operation portion 11 as a variable.

It should be noted that the values of the constants p and q can be determined arbitrarily. When the constant q is 0, the frequency f of the vibration portion 17 in the case where the movement velocity v of the hammer 5 is 0 becomes 0. On the other hand, when the constant q is larger than 0, the frequency f of the vibration portion 17 in the case where the movement velocity v of the hammer 5 is 0 becomes larger than 0. The constant q can be set to be, for example, about 100 Hz.

The controller 12 can also determine a change amount Δf of the frequency f by the following function (6) that uses, as a variable, the movement velocity v of the hammer 5 that is based on the input operation to the operation portion 11.

$$\Delta f=rv \text{ (}r\text{ is a constant)} \tag{6}$$

The function expressing Δf is not limited to the function (6), and a different function that uses the movement velocity v of the hammer 5 that is based on the input operation to the operation portion 11 as a variable may also be used. The function expressing Δf may be a function that uses an acceleration of the hammer 5 that is based on the input operation to the operation portion 11 as a variable. It should be noted that the value of the constant r can be determined arbitrarily.

Figure 7:
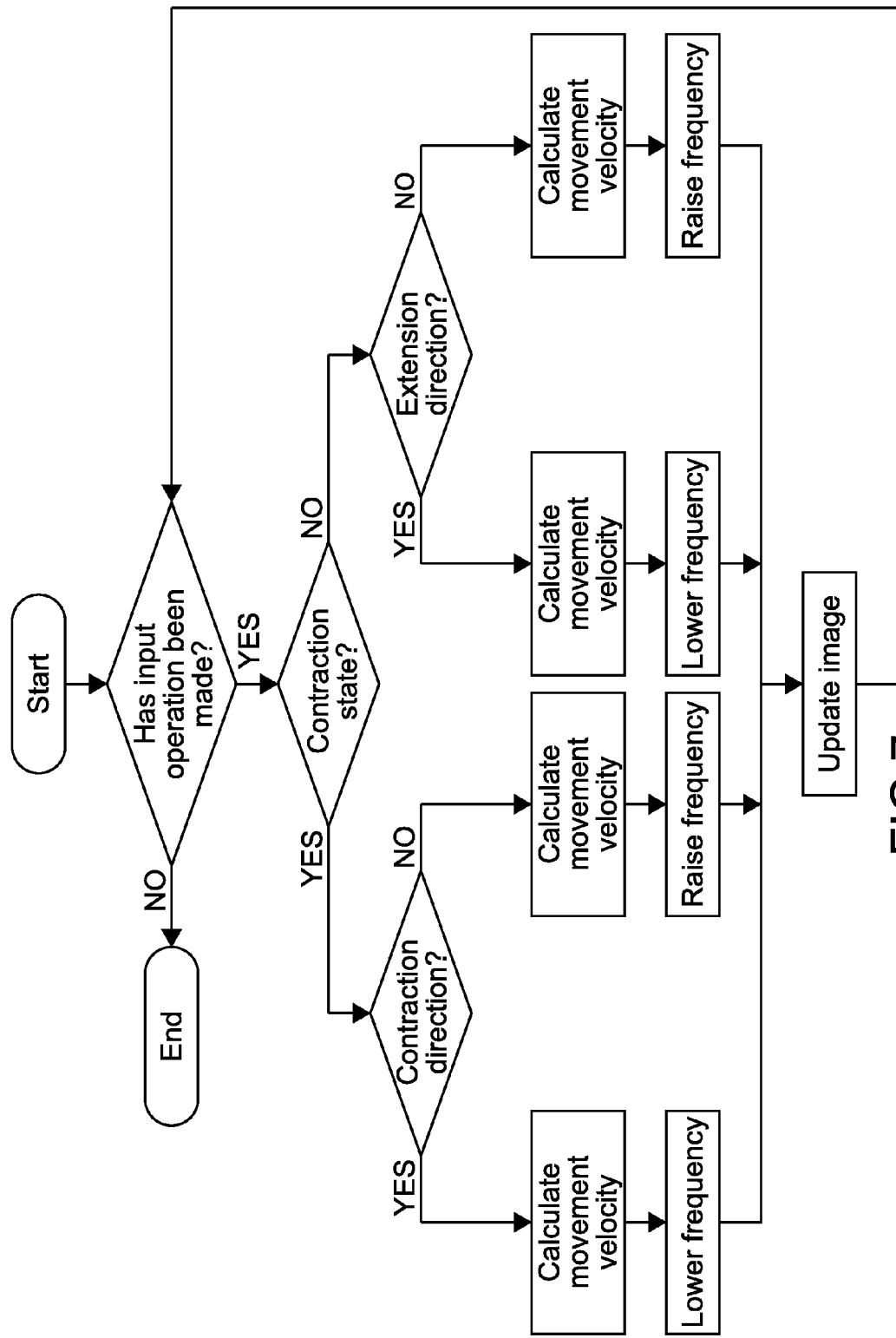
FIG. 7 is a flowchart showing an example of a flow of processing of the controller in the input system shown in FIG. 1.

FIG. 7 is a flowchart showing a flow of processing of the controller 12 that is based on the descriptions above. FIG. 7 shows the flow of processing of the controller 12 in a state where the hammer 5 is in contact with the head portion 6c of the spring toy 6. The flow up to the step of determining, by the controller 12, whether the spring S of the spring toy 6 is contracted (or extended) is the same as that of FIG. 4.

When the spring S is contracted to be shorter than the natural length a, the controller 12 determines which of the contraction direction and the extension direction of the spring S the input operation of the user is made in. When the input operation of the user is made in the contraction direction in which the spring S contracts (spring S additionally contracts from natural length a), the controller 12 lowers the frequency f of the vibration portion 17 only by Δf based on a result of calculating the movement velocity v. On the other hand, when the input operation of the user is made in the extension direction in which the spring S extends (spring S extends to return to natural length a), the controller 12 raises the frequency f of the vibration portion 17 only by Δf based on the result of calculating the movement velocity v.

On the other hand, when the spring S is extended to be longer than the natural length a, the controller 12 determines which of the extension direction and the contraction direction of the spring S the input operation of the user is made in. When the input operation of the user is made in the extension direction in which the spring S extends (spring S additionally extends from natural length a), the controller 12 lowers the frequency f of the vibration portion 17 only by Δf based on the result of calculating the movement velocity v. On the other hand, when the input operation of the user is made in the contraction direction in which the spring S contracts (spring S contracts to return to natural length a), the controller 12 raises the frequency f of the vibration portion 17 only by Δf based on the result of calculating the movement velocity v.

Then, the controller 12 updates the image displayed on the screen 14a to an image corresponding to the relevant state.

As described above, when the hammer 5 moves based on the input operation made to the operation portion 11 by the user, the controller 12 can determine the vibration condition of the vibration portion 17 (amplitude A and frequency f) so as to present a realistic elastic sense to the user. Specifically, the controller 12 can determine, based on the input operation to the operation portion 11, the vibration condition of the vibration portion 17 (amplitude A and frequency f) using a function obtained by combining the functions 3, 4, 5, and the like as appropriate.

In addition, as described above, the input system 10 of this embodiment is structured to receive vibrations matching the extension and contraction of the spring S of the spring toy 6 on the screen 14a viewed by the user. As a result, the user visually as well as auditorially receives an elastic sense. Therefore, the input system 10 can present to the user an elastic sense that is extremely close to that of an actual spring.

It should be noted that when the user is not moving the operation portion 11 (hammer 5 is not moving on screen 14a), the controller 12 can determine the vibration condition of the vibration portion 17 as appropriate. In this case, the controller 12 may set the vibration condition of the vibration portion 17 to be constant or may change the vibration condition of the vibration portion 17 based on the position of the hammer 5 on the screen 14a.

In this embodiment, the controller 12 basically does not cause the vibration portion 17 to vibrate when the user is not moving the operation portion 11. However, the user feels an awkwardness when the vibration of the vibrating vibration portion 17 suddenly stops. This is considered to be based on an experience of the user that, in an actual spring, the vibration in the contraction and extension direction stays for a while after the spring is elastically deformed and stops.

To solve this, the controller 12 gradually lowers, for a predetermined time T after the operation portion 11 stops, the amplitude A of the vibration portion 17 until the amplitude A becomes 0 from an amplitude $A_1$ obtained right before the operation portion 11 stops. The amplitude A in the predetermined time T can be expressed by the following function using an elapse time t from when the operation portion 11 is put to a still state, for example.

$$A=((T-t)/T)A_1$$

Second Embodiment

Overall Structure

Figure 8:
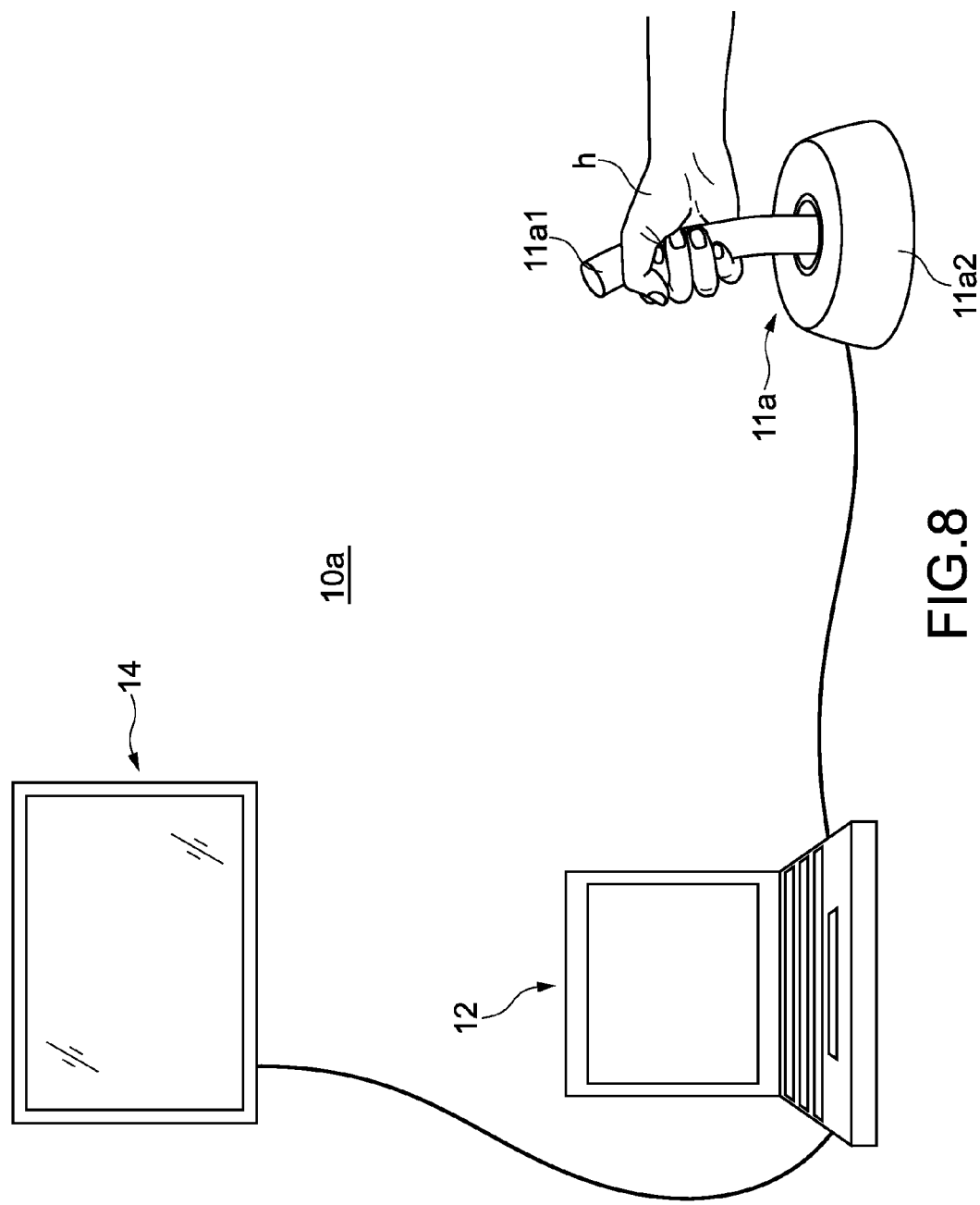
FIG. 8 is a schematic structural diagram of an input system according to a second embodiment of the present disclosure.
Figure 9:
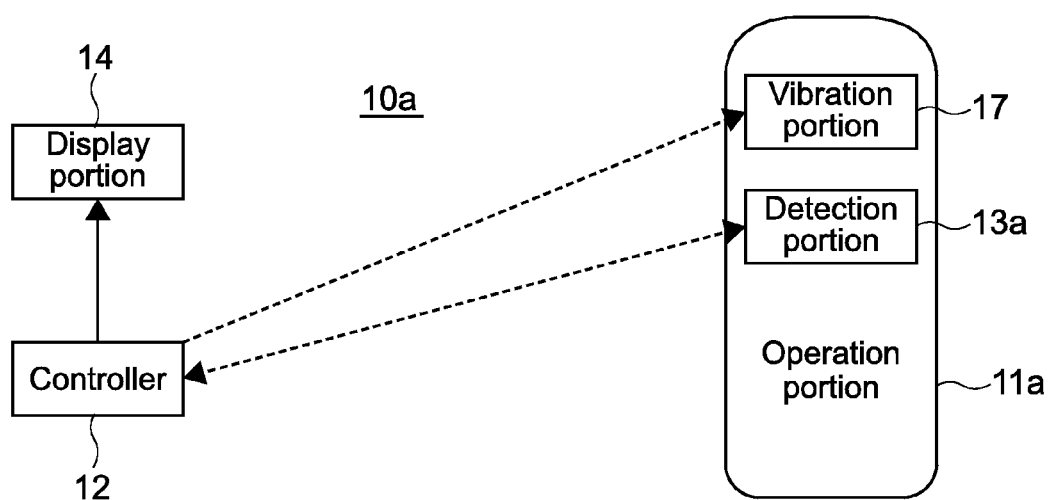
FIG. 9 is a functional block diagram of the input system shown in FIG. 8.

FIG. 8 is a schematic structural diagram of an input system 10a according to a second embodiment of the present disclosure. FIG. 9 is a functional block diagram of the input system 10a shown in FIG. 8. The input system 10a of this embodiment has the same structure as the input system 10 according to the first embodiment except for the following structures. A detection portion 13a of the input system 10a is provided inside an operation portion 11a. The operation portion 11a and the display portion 14 are connected to the controller 12 by wires.

(Structures of Operation Portion and Detection Portion)

The operation portion 11a is structured as an input device and is a joystick including a lever portion 11a1 that is grabbed by the hand h of the user and receives an input operation and a pedestal portion 11a2 that supports a lower end portion of the lever portion 11a1 such that the lever portion 11a1 is movable using the lower end portion thereof as a fulcrum. The vibration portion 17 is provided inside the lever portion 11a1, and the detection portion 13a is provided inside the pedestal portion 11a2.

The detection portion 13a detects an input operation of the user with respect to the lever portion 11a1 of the operation portion 11a. The detection portion 13a detects an operation of the lever portion 11a1 and outputs the detection result to the controller 12. A type of the detection portion 13a is not limited as long as it is a sensor capable of detecting an operation at the lower end portion of the lever portion 11a1. As the structure of the detection portion 13a, a structure that uses a displacement sensor, a velocity sensor, an acceleration sensor, an angle sensor, an angular velocity sensor, or the like may be used.

(Modified Example of Operation Portion and Detection Portion)

The shape of the operation portion 11a may be the same as that of the operation portion 11 according to the first embodiment. In other words, the operation portion 11a may have a structure in which the vibration portion 17 and the detection portion 13a are provided inside a bar-type casing. Therefore, the detection portion 13a operates together with the operation portion 11a. As the structure of the operation portion 13a, a structure capable of detecting its own operation is used. As the structure of the detection portion 13a, a structure that uses, for example, a triaxial motion sensor or a six-axis motion sensor is used.

(Function of Input System)

In the input system 10a, the controller 12 drives the vibration portion 17 based on the input operation that has been detected by the detection portion 13a and made by the hand h of the user with respect to the operation portion 11a, to present an elastic sense to the hand h of the user.

Figure 10A:
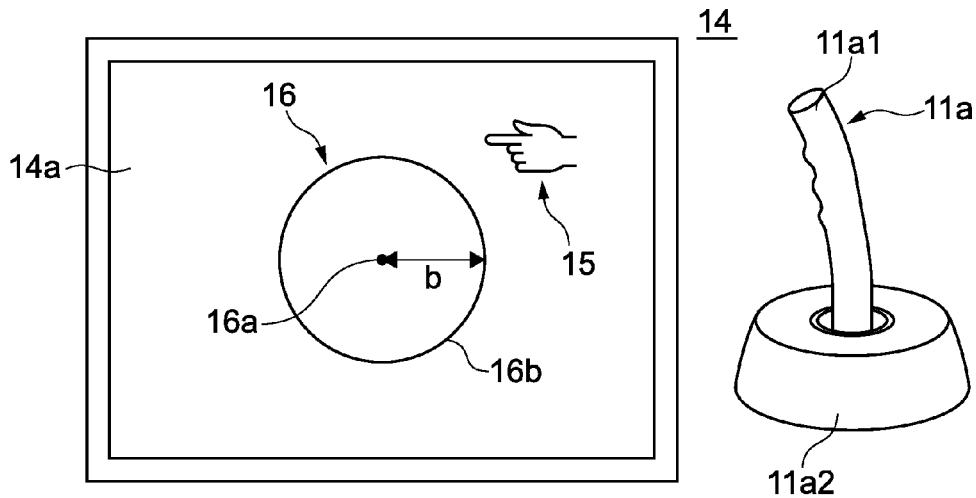
FIGS. 10A to 10C are diagrams showing examples of an operation of the input system shown in FIG. 8.
Figure 10B:
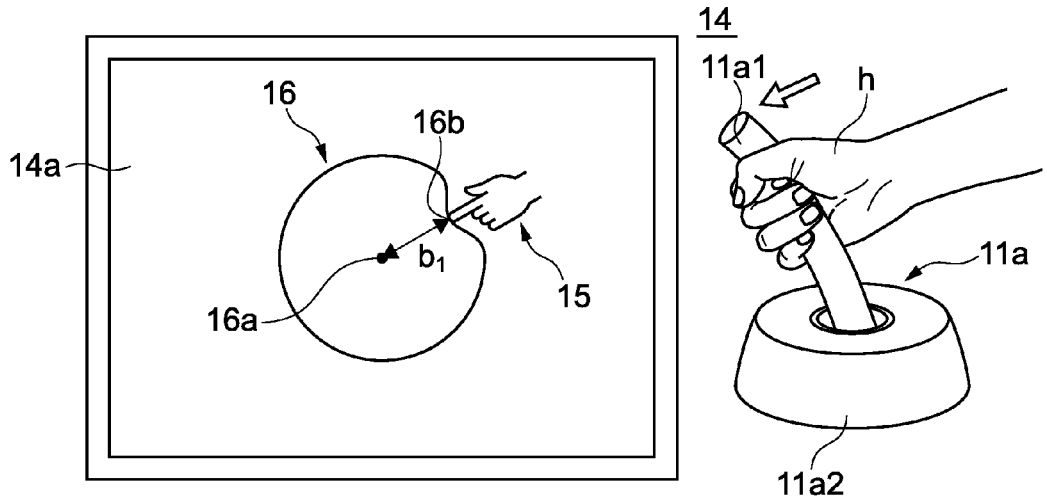
Figure 10C:
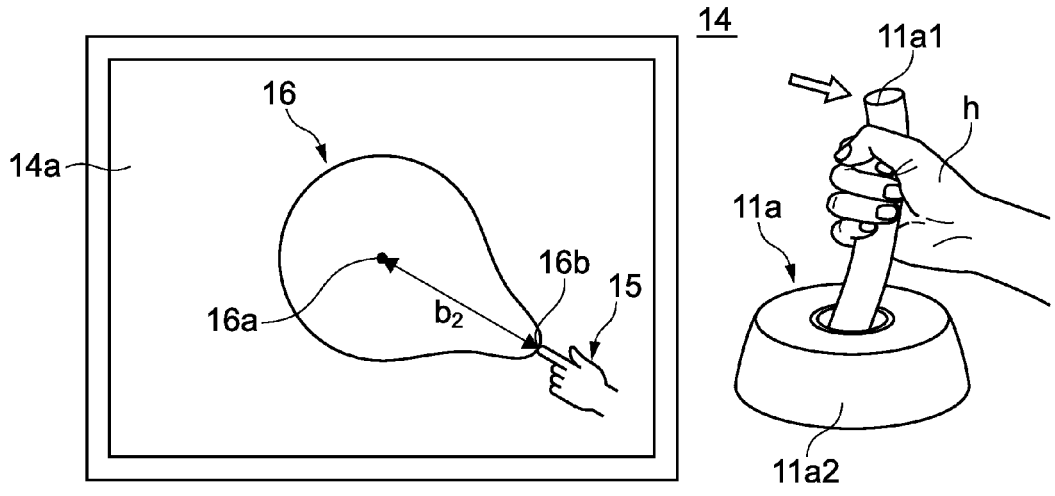

FIGS. 10A to 10C are each a diagram schematically showing display of the screen 14a of the display portion 14 and an operation of the operation portion 11a. Displayed on the screen 14a is an image including a hand-shaped pointer 15 pointing, with an index finger, an operation target that moves by an input operation made by the hand h of the user with respect to the operation portion 11a and a rubber ball 16 as an object that receives an action from the pointer 15.

Assumed as the rubber ball 16 is a sphere having a fixed center portion 16a, the inside of the sphere being filled with air sealed by an outer circumferential portion 16b made of rubber. The outer circumferential portion 16b of the rubber ball 16 can be elastically deformed about the center portion 16a. As shown in FIG. 10A, a radius of the rubber ball 16 (distance between center portion 16a and outer circumferential portion 16b) in a steady state is represented by b.

The controller 12 reproduces, as well as display on the screen 14a a series of operations in which the pointer 15 (tip end portion of index finger) pokes the rubber ball 16 based on the detection result of the detection portion 13a, virtual stimulations corresponding to the elasticity of the rubber ball 16, that are supposedly applied to the pointer 15 along with the operations. The controller 12 reproduces the virtual stimulations that are supposedly applied to the pointer 15 by vibrating the vibration portion 17 inside the operation portion 11a, and thus presents an elastic sense of the rubber ball 16 to the user.

When the user makes an input operation of moving the lever portion 11a1 of the operation portion 11a such that the pointer 15 approaches the center portion 16a of the rubber ball 16 while the screen 14a is in the state shown in FIG. 10A, the detection portion 13a detects the operation of the operation portion 11a and outputs the detection result to the controller 12. Based on the detection result from the detection portion 13a, the controller 12 displays an operation of the pointer 15 corresponding to the operation of the lever portion 11a1 of the operation portion 11a on the screen 14a. Specifically, the controller 12 displays, on the screen 14a, an operation in which the pointer 15 moves to the outer circumferential portion 16b of the rubber ball 16 and elastically deforms the outer circumferential portion 16b of the rubber ball 16 toward the center portion 16a.

On the contrary, when the user makes an input operation of moving the lever portion 11a1 of the operation portion 11a such that the pointer 15 moves away from the center portion 16a of the rubber ball 16 while the screen 14a is in the state shown in FIG. 10B, the detection portion 13a detects the operation of the lever portion 11a1 of the operation portion 11a and outputs the detection result to the controller 12. Based on the detection result from the detection portion 13a, the controller 12 displays an operation of the pointer 15 corresponding to the operation of the lever portion 11a1 of the operation portion 11a on the screen 14a. Specifically, the controller 12 displays, on the screen 14a, an operation in which the pointer 15 moves away from both the center portion 16a of the rubber ball 16 and the outer circumferential portion 16b thereof so that the rubber ball 16 restores its spherical shape.

Here, a case where the pointer 15 presses the rubber ball 16 so that it contracts to have a radius $b_1$ smaller than the radius b in the steady state as shown in FIG. 10B will be discussed.

In an actual rubber ball, since an inner pressure increases as a contraction amount increases, an elastic force that acts outwardly increases. Therefore, the user presumes that, in moving the pointer 15, a resistive force that the pointer 15 receives from the rubber ball 16 increases as the contraction amount of the rubber ball 16 increases. The controller 12 reproduces the elastic sense in which the resistive force that the pointer 15 receives from the rubber ball 16 increases by increasing the amplitude A of the vibration portion 17 in the operation portion 11a.

Next, a case where the pointer 15 extends the rubber ball 16 so that it extends to have a radius $b_2$ larger than the radius b in the steady state on the screen 14a as shown in FIG. 10C will be discussed.

In an actual rubber ball, since an inner pressure decreases as a contraction amount increases, an elastic force that acts inwardly increases. Therefore, the user presumes that, in moving the pointer 15, a resistive force that the pointer 15 receives from the rubber ball 16 increases as the extension amount of the rubber ball 16 increases. The controller 12 reproduces the elastic sense in which the resistive force that the pointer 15 receives from the rubber ball 16 increases by increasing the amplitude A of the vibration portion 17 in the operation portion 11a.

Third Embodiment

Overall Structure

Figure 11:
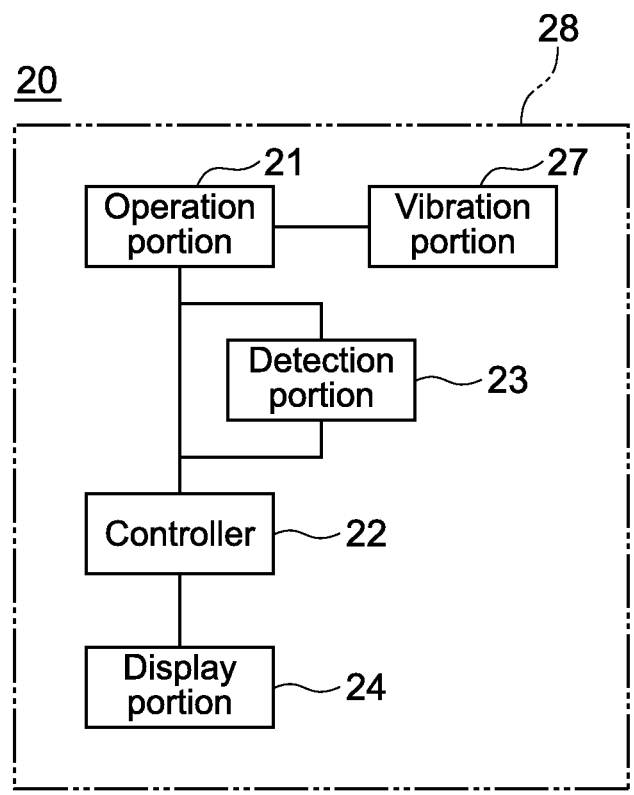
FIG. 11 is a functional block diagram of an electronic apparatus according to a third embodiment of the present disclosure.

FIG. 11 is a functional block diagram of an electronic apparatus 20 according to a third embodiment of the present disclosure. The electronic apparatus 20 of this embodiment has the same structure as the input system 10 according to the first embodiment except for the following structures. The electronic apparatus 20 includes a casing 28. In the electronic apparatus 20, an operation portion 21, a controller 22, a detection portion 23, a display portion 24, and a vibration portion 27 are integrally formed with the casing 28 unlike the input system 10 according to the first embodiment.

Figure 12A:
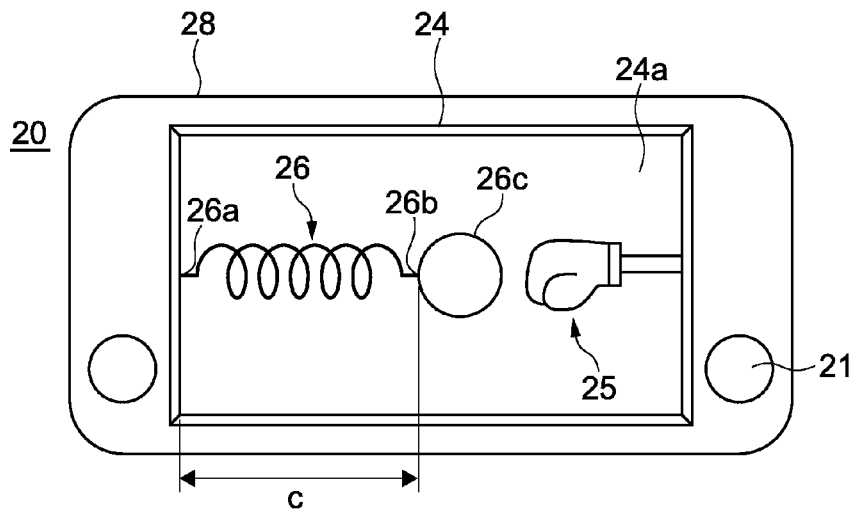
FIGS. 12A to 12C are diagrams showing examples of an operation of the electronic apparatus shown in FIG. 11.
Figure 12B:
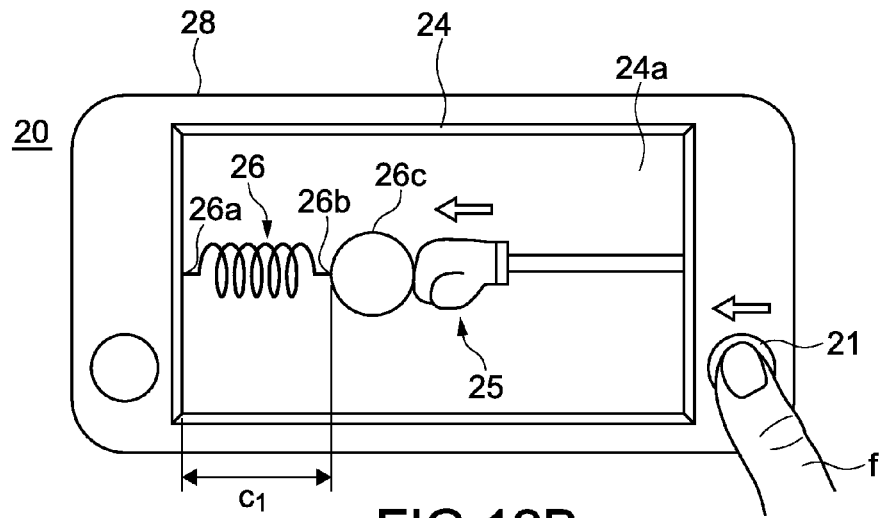
Figure 12C:
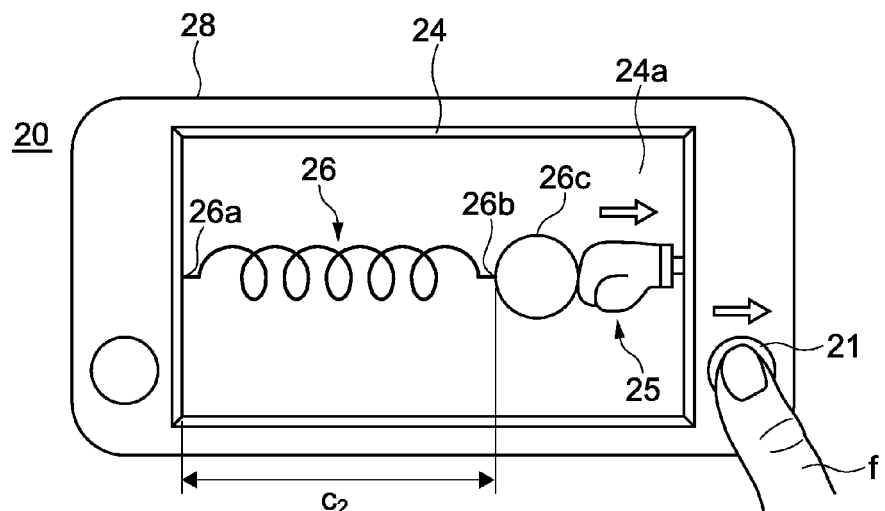

FIGS. 12A to 12C are diagrams each showing display of a screen 24a of the display portion 24 of the electronic apparatus 20 and an operation of the operation portion 21. The casing 28 of the electronic apparatus 20 is capable of being held by a hand of a user. The electronic apparatus 20 receives an input operation made by a finger f (thumb) of the user with respect to the operation portion 21 in a state where the user is holding the electronic apparatus 20. In the casing 28, the operation portion 21 and the screen 24a are exposed from the same surface. Therefore, in the electronic apparatus 20, the user can make an input operation to the operation portion 21 with the finger f while watching the screen 24a.

(Structures of Operation Portion and Detection Portion)

The operation portion 21 is structured as a small joystick that is operated by the finger f of the user. The vibration portion 27 is adjacent to the operation portion 21. Therefore, the vibration of the vibration portion 27 is favorably propagated to the finger f of the user via the operation portion 21.

The detection portion 23 detects an input operation made to the operation portion 21 by the user. The detection portion 23 detects an operation of the operation portion 21 and outputs the detection result to the controller 22. A type of the detection portion 23 is not limited as long as it is a sensor capable of detecting an operation of the operation portion 21. As the structure of the detection portion 23, a structure that uses a displacement sensor, a velocity sensor, an acceleration sensor, an angle sensor, an angular velocity sensor, or the like may be used.

(Function of Electronic Apparatus)

In the electronic apparatus 20, the controller 22 drives the vibration portion 27 based on the input operation that has been detected by the detection portion 23 and made by the finger f of the user with respect to the operation portion 21, to present an elastic sense to the finger f of the user.

Displayed on the screen 24a is an image including a boxing glove 25 as an operation target that moves by an input operation made by the finger f of the user with respect to the operation portion 21 and a spring toy 26 as an object that receives an action from the boxing glove 25.

As the boxing glove 25, a boxing glove is attached to a tip end of a stick that extends from a right end of the screen 24a toward the center. Assumed as the spring toy 26 is a spring toy including a spring S that extends from a left end of the screen 24a toward the center and whose left end portion 26a is fixed, and a spherical punching ball 26c attached to a right end portion 26b of the spring S. The punching ball 26c is movable in the lateral direction, and the spring S can be extended and contracted in accordance with an operation of the punching ball 26c. As shown in FIG. 12A, the natural length of the spring S of the spring toy 26 (distance between left end portion 26a and right end portion 26b) is represented by c.

The controller 22 reproduces, as well as display on the screen 24a a series of operations in which the boxing glove 25 punches the punching ball 26c based on the detection result of the detection portion 23, virtual stimulations corresponding to the elasticity of the spring S, that are supposedly applied to the boxing glove 25 along with the operations. The controller 22 reproduces the virtual stimulations that are supposedly applied to the boxing glove 25 by vibrating the vibration portion 27 inside the operation portion 21, and thus presents an elastic sense of the spring S to the user.

When the user makes, with the finger f, an input operation of moving the operation portion 21 such that the boxing glove 25 moves the punching ball 26c in the left-hand direction while the screen 24a is in the state shown in FIG. 12A, the detection portion 23 detects the operation of the operation portion 21 and outputs the detection result to the controller 22. Based on the detection result from the detection portion 23, the controller 22 displays an operation of the boxing glove 25 corresponding to the operation of the operation portion 21 on the screen 24a. Specifically, the controller 22 displays, on the screen 24a, an operation in which the boxing glove 25 moves to the punching ball 26c and pushes the punching ball 26c in the left-hand direction so that the spring S of the spring toy 26 contracts.

On the contrary, when the user makes an input operation of moving the operation portion 21 in the right-hand direction while the screen 24a is in the state shown in FIG. 12B, the detection portion 23 detects the operation of the operation portion 21 and outputs the detection result to the controller 22. Based on the detection result from the detection portion 23, the controller 22 displays an operation of the boxing glove 25 corresponding to the operation of the operation portion 21 on the screen 24a. Specifically, the controller 22 displays, on the screen 24a, an operation in which the boxing glove 25 moves in the right-hand direction with the punching ball 26c so that the spring S of the spring toy 26 extends.

Here, a case where the boxing glove 25 causes the spring S of the spring toy 26 to contract to $c_1$ smaller than the natural length c on the screen 24a as shown in FIG. 12B will be discussed.

Using a spring constant as a proportional constant, an elastic force of an actual spring becomes larger as a contraction amount increases. Therefore, in moving the boxing glove 25, the user presumes that a resistive force applied to the boxing glove 25 from the punching ball 26c of the spring toy 26 becomes larger as the contraction amount of the spring S increases. The controller 22 expresses the elastic sense in which the resistive force applied to the boxing glove 25 from the punching ball 26c of the spring toy 26 becomes larger, by increasing an amplitude A of the vibration of the vibration portion 27 in the operation portion 21.

Next, a case where the boxing glove 25 causes the spring S of the spring toy 26 to extend to $c_2$ larger than the natural length c on the screen 24a as shown in FIG. 12C will be discussed.

Using a spring constant as a proportional constant, an elastic force of an actual spring becomes larger as a extension amount increases. Therefore, in moving the boxing glove 25, the user presumes that a resistive force applied to the boxing glove 25 from the punching ball 26c of the spring toy 26 becomes larger as the extension amount of the spring S increases. The controller 22 expresses the elastic sense in which the resistive force applied to the boxing glove 25 from the punching ball 26c of the spring toy 26 becomes larger, by increasing an amplitude A of the vibration of the vibration portion 27 in the operation portion 21.

Fourth Embodiment

Overall Structure

Figure 13:
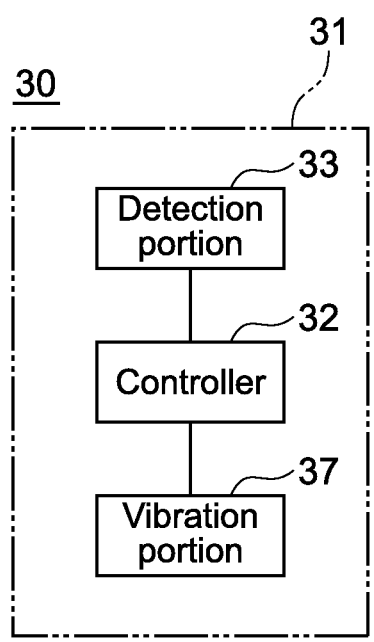
FIG. 13 is a functional block diagram of an input device according to a fourth embodiment of the present disclosure.

FIG. 13 is a functional block diagram of an input device 30 according to a fourth embodiment of the present disclosure. The input device 30 of this embodiment has the same structure as the input system 10 according to the first embodiment except for the following structures. The input device 30 does not include a structural element that can be visually recognized by the user, such as a screen, unlike the input system 10 according to the first embodiment. The input device 30 includes a casing 31. In the input device 30, a controller 32, a detection portion 33, and a vibration portion 37 are integrally formed with the casing 31. In the input device 30, the casing 31 itself constitutes an operation portion that receives an input operation from a hand of the user.

(Structures of Casing and Detection Portion)

The casing 31 is formed as a bar that can be grabbed by the hand of the user. The detection portion 33 operates with the casing 31. As a structure of the detection portion 33, a structure capable of detecting its own operation is used. As the structure of the detection portion 33, a structure that uses, for example, a triaxial motion sensor or a six-axis motion sensor is used.

(Function of Input Device)

In the input device 30, the controller 32 drives the vibration portion 37 of the casing 31 based on an input operation that has been made by the user with respect to the casing 31 and detected by the detection portion 33, to present an elastic sense to the user.

The input device 30 is used for the user to move an operation target in virtual space. The operation target does not need to be visually recognizable by the user as long as it exists in the virtual space. Example of the operation target in the virtual space is a pointer that is visually recognizable by a user wearing a head mount display (not shown).

The detection portion 33 detects a position of the operation target and outputs the detection result to the controller 32. The controller 32 grasps a positional relationship between the operation target and a predetermined first position in the space. The controller 32 drives the vibration portion 37 based on the positional relationship of the operation target with respect to the first position, and thus presents an elastic sense as if there is a deformable object at the reference position to the user.

As an example, a case where, assuming that one end portion of the spring S is fixed to the first position and the other end portion of the spring S is fixed to a second position in the virtual space, the operation target is at the second position will be discussed. The spring S may either be visible or invisible by the user. In this case, the controller 32 increases the amplitude of the vibration portion 37 when the operation target approaches the first position by an input operation made by the user with respect to the input device 30 and decreases the amplitude of the vibration portion 37 when the operation target moves away from the first position.

The embodiments of the present disclosure have been described above, but the present disclosure is not limited to the embodiments above and can be variously modified without departing from the gist of the present disclosure.

For example, the shape of the operation target that moves by an input operation of the user and the shape of the object that receives an action from the operation target can be set arbitrarily. In addition, the connections of the structures described in the specification may either be by wires or without wires.

Moreover, the present disclosure may of course adopt a structure that presents, to the user, senses other than an elastic sense by the vibration. Examples of the presentable senses include a viscous sense, an inertial sense, a frictional sense, and an impact sense. When the vibration conditions corresponding to those senses are expressed by functions, the controller can determine the vibration conditions by appropriately combining those functions with the functions (3) to (5) above.

It should be noted that the present disclosure may also take the following structures.

(1) An input device, including:
an operation portion configured to receive an input operation made by a user;
a vibration portion configured to vibrate the operation portion;
a detection portion configured to detect the input operation; and
a controller configured to determine a vibration condition of the vibration portion based on the input operation detected by the detection portion and present an elastic sense to the user by driving the vibration portion under the determined vibration condition.

(2) The input device according to (1) above,
in which the controller controls a movement of an operation target displayed on a screen based on the input operation and determines the vibration condition based on a relative position between an object and the operation target displayed on the screen.

(3) The input device according to (2) above,
in which the object is an image that can be deformed according to the relative position with respect to the operation target.

(4) The input device according to (3) above,
in which the object is an image representing an elastic body that can be elastically deformed.

(5) The input device according to any one of (2) to (4) above,
in which the controller determines the vibration condition using a function that uses at least one of a distance between the operation target and the object and a movement velocity of the operation target as a variable.

(6) The input device according to any one of (2) to (5) above,
in which the controller determines the vibration condition using a function that uses at least one of a distance between a predetermined first position and the operation target and a movement velocity of the operation target as a variable.

(7) The input device according to any one of (2) to (6) above,
in which the controller sets at least one of an amplitude and frequency of the vibration portion to become larger as the operation target approaches a predetermined first position from a second position different from the first position.

(8) The input device according to any one of (2) to (7) above,
in which the controller sets at least one of an amplitude and frequency of the vibration portion to become larger as the operation target moves farther away from a predetermined first position than a second position different from the first position.

(9) The input device according to any one of (2) to (8) above,
in which the controller attenuates an amplitude of the vibration portion after the operation target stops.

(10) An input system, including:
an input device including an operation portion that receives an input operation made by a user and a vibration portion that vibrates the operation portion;
a detection portion configured to detect the input operation; and
a controller configured to determine a vibration condition of the vibration portion based on the input operation detected by the detection portion and present an elastic sense to the user by driving the vibration portion under the determined vibration condition.

(11) The input system according to (10) above,
in which the detection portion is integrated with the input device.

(12) An electronic apparatus, including:
an operation portion configured to receive an input operation made by a user;
a vibration portion configured to vibrate the operation portion;
a detection portion configured to detect the input operation;
a display portion including a screen for displaying an image; and
a controller configured to control a movement of an operation target displayed on the screen based on the input operation, determine a vibration condition of the vibration portion based on a relative position between an object and the operation target displayed on the screen, and present an elastic sense to the user by driving the vibration portion under the determined vibration condition.

(13) A sense presentation method, including:
detecting an input operation of a user with respect to an operation portion;
determining a vibration condition of the operation portion based on the detected input operation; and
presenting an elastic sense to the user by vibrating the operation portion under the determined vibration condition.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input device, comprising:
an operation portion configured to receive an input operation made by a user;
a vibration portion configured to vibrate the operation portion;
a detection portion configured to detect the input operation; and
a controller configured to change a vibration condition of the vibration portion based on the input operation detected by the detection portion and present an elastic sense to the user by driving the vibration portion under the changing vibration condition;
wherein the controller controls a movement of an operation target displayed on a screen based on the input operation,
wherein the controller changes the vibration condition when a shape of an object displayed on the screen is changed by the operation target so as to present the elastic sense to the user, and wherein a frequency change of the vibration condition is based on a function f=pv+q, wherein: f is a frequency of the vibration portion, p and q are predetermined constants, v is a movement velocity of the operation target.

2. The input device according to claim 1,
wherein the object is an image that can be deformed according to a relative position with respect to the operation target.

3. The input device according to claim 2,
wherein the object is an image representing an elastic body that can be elastically deformed.

4. The input device according to claim 1,
wherein the controller is configured to change the vibration condition using a function based on a distance between the operation target and the object.

5. The input device according to claim 1,
wherein the controller is configured to change the vibration condition using a function based on a distance between a predetermined first position and the operation target.

6. The input device according to claim 1,
wherein the controller sets at least one of an amplitude and frequency of the vibration portion to become larger as the operation target causes at least a part of the object to move from a first position to a second position.

7. The input device according to claim 1,
wherein the controller sets at least one of an amplitude and frequency of the vibration portion to become larger as the operation target moves farther away from a predetermined first position than a second position different from the first position.

8. The input device according to claim 1,
wherein the controller attenuates an amplitude of the vibration portion after the operation target stops.

9. The input device according to claim 1, wherein an amplitude change of the vibration condition is based on a function: $A=k*|a-x|^2+l$, wherein: A is an amplitude of the vibration portion, k and l are predetermined constants, a is a natural length of the object, x is a current length of the object and $|a-x|$ is a displacement of the object.

10. The input device according to claim 1, wherein the elastic sense is presented while the operation target is in contact with the object displayed on the screen.

11. The input device according to claim 1, wherein the controller is configured to interactively change the vibration condition based on a relative position of the operation target with respect to the object displayed on the screen at predetermined times.

12. The input device according to claim 1, wherein the frequency change of the vibration condition is further associated with an acceleration value of the operation target.

13. An input system, comprising:
an input device including an operation portion that receives an input operation made by a user and a vibration portion that vibrates the operation portion;
a detection portion configured to detect the input operation; and
a controller configured to change a vibration condition of the vibration portion based on the input operation detected by the detection portion and present an elastic sense to the user by driving the vibration portion under the changing vibration condition, wherein the controller changes the vibration condition when a shape of an object displayed on the screen is changed by an operation target so as to present the elastic sense to the user, and wherein a frequency change of the vibration condition is based on a function: f=pv+q, wherein f is a frequency of the vibration portion, p and q are predetermined constants, v is a movement velocity of the operation target.

14. The input system according to claim 13,
wherein the detection portion is integrated with the input device.

15. An electronic apparatus, comprising:
an operation portion configured to receive an input operation made by a user;

a vibration portion configured to vibrate the operation portion;

a detection portion configured to detect the input operation;

a display portion including a screen for displaying an image; and a controller configured to control a movement of an operation target displayed on the screen based on the input operation, change a vibration condition of the vibration portion when a shape of an object displayed on the screen is changed by the operation target, and present an elastic sense to the user by driving the vibration portion under the changing vibration condition, wherein a frequency change of the vibration condition is based on a function: f=pv+q, wherein f is a frequency of the vibration portion, p and q are predetermined constants, v is a movement velocity of the operation target.

16. A sense presentation method, comprising:
detecting an input operation of a user with respect to an operation portion;

changing a vibration condition of the operation portion when a shape of an object displayed on a screen is changed by an operation target displayed on a screen; and presenting an elastic sense to the user by vibrating the operation portion under the changing vibration condition, wherein a frequency change of the vibration condition is based on a function: f=pv+q, wherein f is a frequency of the vibration portion, p and q are predetermined constants, v is a movement velocity of the operation target.

* * * * *